United States Patent [19]

Ragas

[11] Patent Number: 5,560,073
[45] Date of Patent: Oct. 1, 1996

[54] BRAKE DUST REMOVAL APPARATUS AND METHOD OF USE THEREFOR

[76] Inventor: Kenneth J. Ragas, 34329 Hwy 11, Buras, La. 70041

[21] Appl. No.: 478,778

[22] Filed: Jun. 7, 1995

[51] Int. Cl.[6] .................................................. A47L 5/38
[52] U.S. Cl. ................................................ 15/301; 15/345
[58] Field of Search .............................. 15/300.1, 301, 15/339, 345, 394

[56] References Cited

U.S. PATENT DOCUMENTS

| | | | |
|---|---|---|---|
| 3,731,340 | 5/1973 | Pitre | 15/345 |
| 3,972,089 | 8/1976 | Parks . | |
| 3,978,547 | 9/1976 | Lawson | 15/345 |
| 4,205,412 | 6/1980 | Weber . | |
| 4,514,936 | 5/1985 | Hurtado | 15/301 |
| 4,670,062 | 6/1987 | Lester . | |
| 4,712,270 | 12/1987 | Palmer . | |
| 4,780,927 | 11/1980 | Clayton . | |
| 4,820,000 | 4/1989 | Jacobson . | |
| 4,865,401 | 9/1989 | Jacobson . | |
| 5,162,053 | 11/1992 | Kowalski . | |

Primary Examiner—David Scherbel
Assistant Examiner—Terrence R. Till
Attorney, Agent, or Firm—Richard C. Litman

[57] ABSTRACT

A dust removal apparatus including two housings hinged together that may be closed, enchambering a brake or clutch drum or disc. Each housing has a notch disposed in the annular surface that mates with the annular surface of the other housing such that when the housings are closed, the notches define a throughbore for receiving a lathe mounting shaft. A similarly disposed pair of notches define a throughbore for receiving a lathe expansible bellows. Vacuum means introduced in the chamber purges the brake or clutch drum or disc of dust. The invention provides for a method of use thereof.

8 Claims, 3 Drawing Sheets

BRAKE DUST REMOVAL APPARATUS AND METHOD OF USE THEREFOR

BACKGROUND OF THE INVENTION

1. Field of the Invention

This invention relates to the servicing of vehicle brakes and clutches. More specifically, the present invention relates to removal of dust accumulated on vehicle brake and clutch discs and drums.

2. Description of the Prior Art

Many automobiles include brakes and/or clutches having discs or drums. For simplicity, since brakes and clutches have generally analogous structures, "brake" includes brakes and clutches hereinafter. Due to the excessive friction inherent in brake operation, brake discs and drums must be serviced many times during the life of an automobile. The discs are either resurfaced or replaced. The drums are typically resurfaced and relined. For simplicity, "disc" includes discs and drums hereinafter.

Disc resurfacing generates a significant amount of metal shavings and dust which is dispersed into the local atmosphere. Those who resurface brakes are subjected to this dust and risk eye and pulmonary injury, among others. A need exists for collecting brake dust with an apparatus providing for universal, timely, convenient and sealing adaptability to a brake disc resurfacing lathe.

Several types of dust removal apparatuses are described in the literature. For example, U.S. Pat. No. 3,972,089, issued Aug. 3, 1976, to Calvin G. Parks, describes a brake drum duster system. The device includes a cylinder having an open end for receiving a brake assembly. The closed end includes throughbores for introducing a high pressure air blast and for evacuating the cylinder. The invention includes adapter rings which may be changed to accommodate different sized brake drums.

U.S. Pat. No. 4,205,412, issued Jun. 3, 1980, to Ronald W. Weber, describes an automotive brake dust recovery unit. The device includes an open-ended, cylindrical-shaped adaptor. One end receives a vehicle brake assembly. An annular seal is provided for sealing the junction between the device and the brake assembly. No provision for differently sized brake assemblies is provided. The other end receives a vacuum attachment. The other end also includes a nozzle which introduces a blast of air for dislodging brake dust.

U.S. Pat. No. 4,670,062, issued Jun. 2, 1987, to James E. Lester, describes a brake drum cleaner. The device includes a frustum-shaped adaptor. The adaptor includes an inflatable, interior, annular, toroidal seal for mating with a brake assembly. The device contains a set of air jets and vacuum means for collecting brake dust. The device also includes water misting means for settling residual air-borne particulate matter in the vacuum exhaust.

U.S. Pat. No. 4,712,270, issued Dec. 15, 1987, to Gary E. Palmer, describes a brake drum encapsulator. U.S. Pat. No. 4,820,000, issued Apr. 11, 1989, to Earl B. Jacobson, describes a glove bag waste removal system for asbestos impregnated brakes. Both devices include a cylindrical frame wrapped with material. Both devices provide for vacuum means for evacuating brake dust. The Palmer device has an elasticized opening at one end of the cylindrical frame which non-sealingly secures the device to a brake assembly. The device has at the other end of the cylindrical frame, provisions for hands, similar to gloves, for manipulating the brake assembly. The Jacobson device has no closure means at the end which receives the brake assembly. The Jacobson device does have hand provisions, however, extending from the side of the cylindrical-shaped device.

U.S. Pat. No. 4,865,401, issued Sep. 12, 1989, to Earl B. Jacobson, describes another glove bag waste removal system for asbestos impregnated brakes similar to the Jacobson patent above. The device is frustum-shaped and includes means for attaching the device to an automobile. The device otherwise maintains similar attributes as the above patent to Jacobson.

U.S. Pat. No. 4,780,927, issued Nov. 1, 1988, to James E. Clayton, describes a method and apparatus for removing and collecting dust. The device includes a box-shaped housing with an aperture at one end for receiving a brake assembly. The aperture does not seal to the brake assembly. The other end has provisions for hands, similar to gloves, for manipulating the brake assembly. The device also includes provides for vacuum means.

U.S. Pat. No. 5,162,053, issued Nov. 10, 1992, to Walter J. Kowalski, describes a vehicular brake material collection system. The device is purposed for on-board dust collection during normal operation of the vehicle. The device includes a set of nozzles disposed on the brake drum plate and a shroud substantially encapsulating a portion of the brake assembly. Vacuum means is introduced via the nozzles and shroud. Brake dust is withdrawn from the brake assembly by the vacuum during vehicle operation.

Clearly, a need for a dust removal apparatus including universal, sealing adaptability.

None of the above references, taken alone or in combination, are seen as teaching or suggesting the presently claimed dust removal apparatus and method of use therefor.

SUMMARY OF THE INVENTION

The present invention overcomes the limitations above by providing an apparatus having universal, sealing adaptability to a brake disc/drum resurfacing lathe. The invention includes two semicylindrically-shaped housings which are hinged together longitudinally. The invention includes articulation means for rotating the housings closed, thereby forming a chamber having a central axis. The chamber receives a brake disc.

Each housing has a notch disposed in the straight edge of a first vertical face such that when the housings are closed, the notches define a first throughbore through a first vertical face of the chamber. Each housing has another notch disposed in the straight edge of a second vertical face such that when the housings are closed, the notches define a throughbore through a second vertical face of the chamber. The first throughbore sealingly receives the expansible bellows of a drum/disc lathe. The second throughbore receives the mounting shaft of the drum/disc lathe.

The invention provides for a method of using the above apparatus. The method includes mounting a vehicle brake disc on a brake resurfacing lathe mounting shaft, locating the housings proximate to the lathe and brake disc, closing the housings and forming a chamber about the brake disc, and evacuating the chamber of dust formed therein.

In consideration of the above, an object of the invention is to provide a dust removal apparatus which is adaptable to any vehicle brake disc and brake disc resurfacing lathe.

Another object of the invention is to provide a dust removal apparatus which sealingly encases a brake disc during resurfacing.

A further object of the invention is to provide a method for removing dust from a brake disc using the disclosed dust removal apparatus.

An additional object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features of the invention consistently throughout the attached drawings.

DETAILED DESCRIPTION OF THE PREFERRED EMBODIMENT

1. Dust Removal Apparatus

Figure 1:
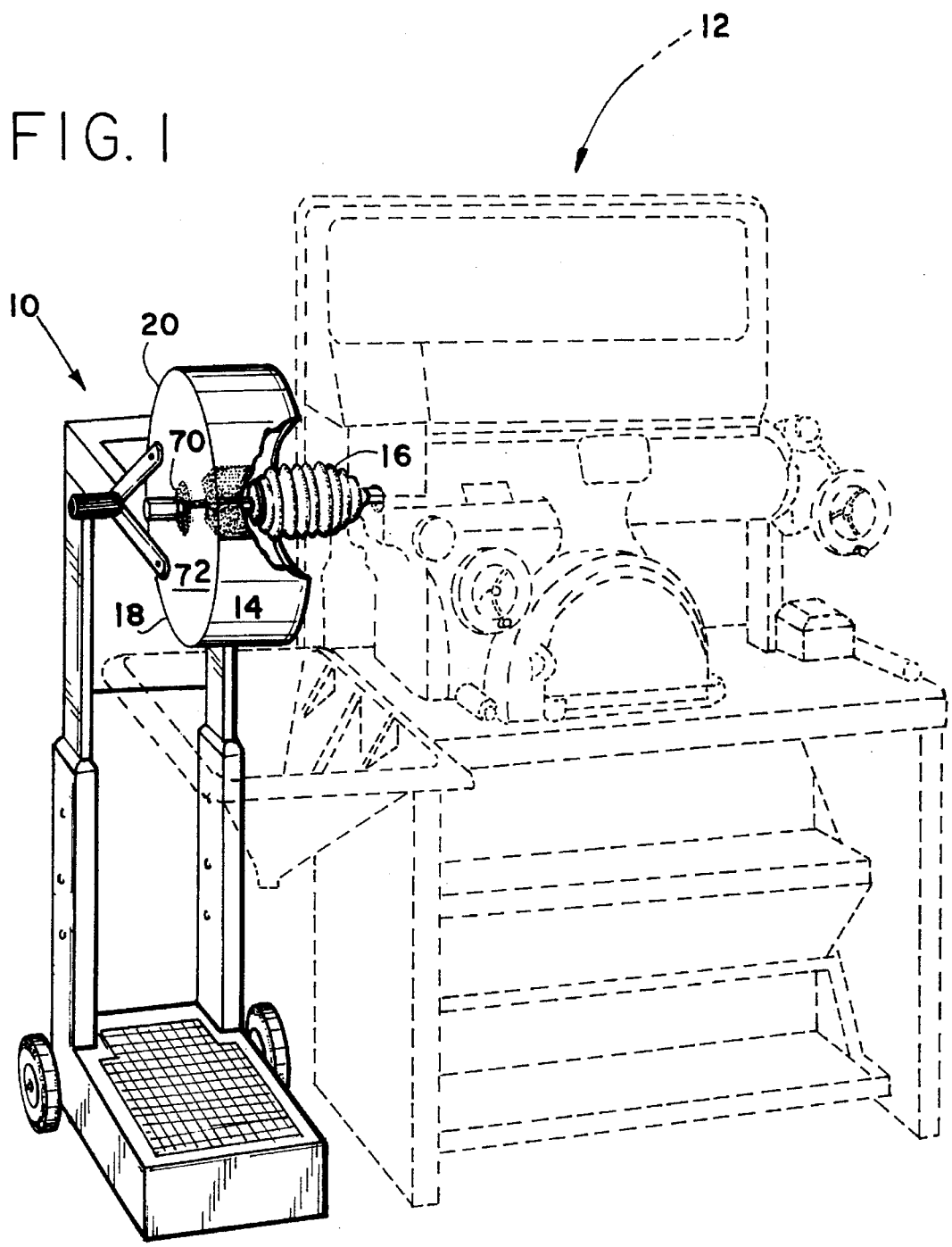
FIG. 1 is an environmental perspective view of the invention receiving a brake disc mounted to a brake disc resurfacing lathe.

Referring to FIG. 1, the invention 10 is shown with a brake resurfacing lathe 12. The lathe 12 is shown in dashed lines except for the reciprocating mounting shaft 14 encased by an expansible bellows 16. Preferably, the invention is envisioned for use with an Ammco® Model 4100 Medium-Duty Drum/Disc Lathe. However, any lathe having equivalent structural features fall within the ambit of the present invention.

Figure 2:
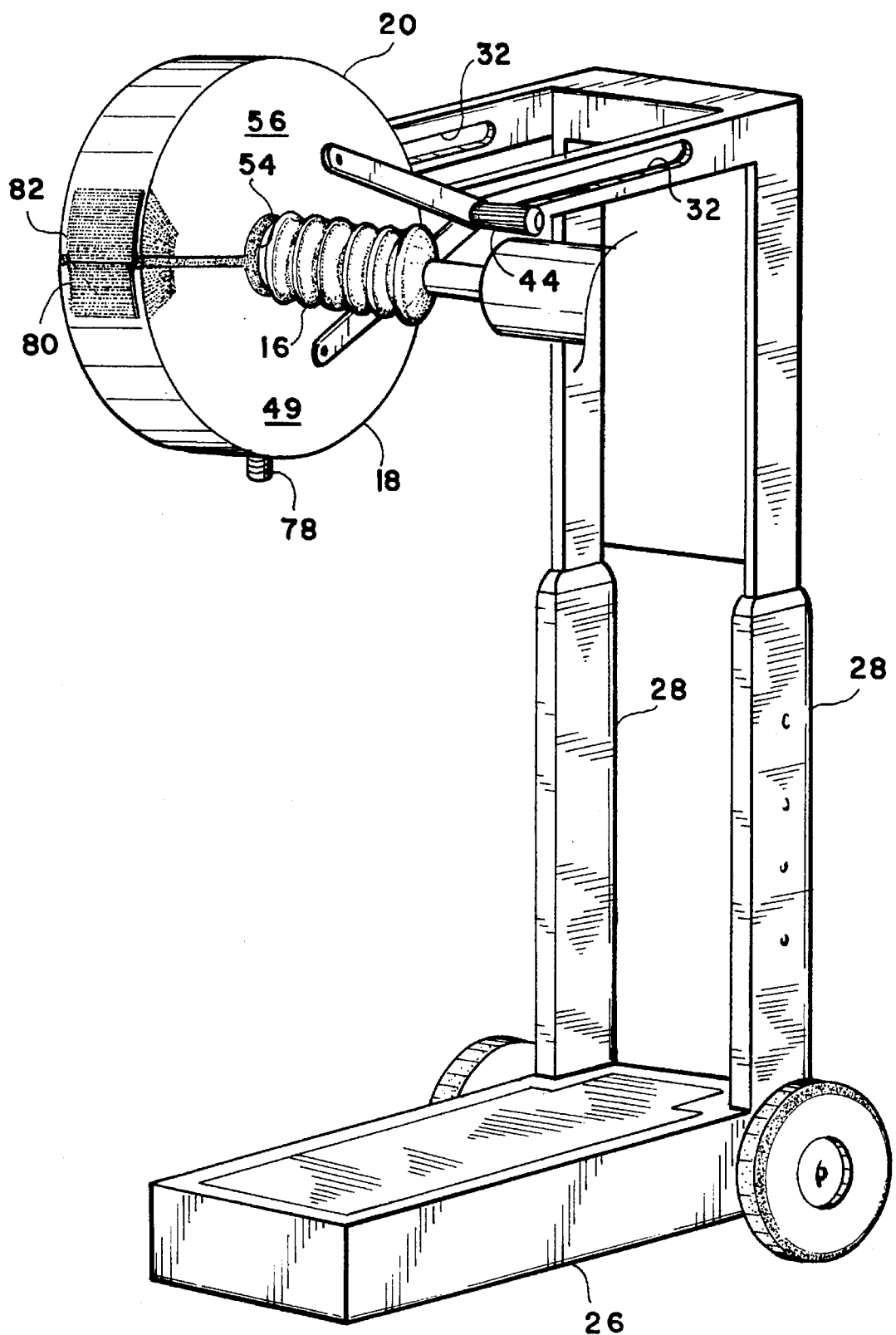
FIG. 2 is a top side perspective view of the invention with the housings ajar.
Figure 3:
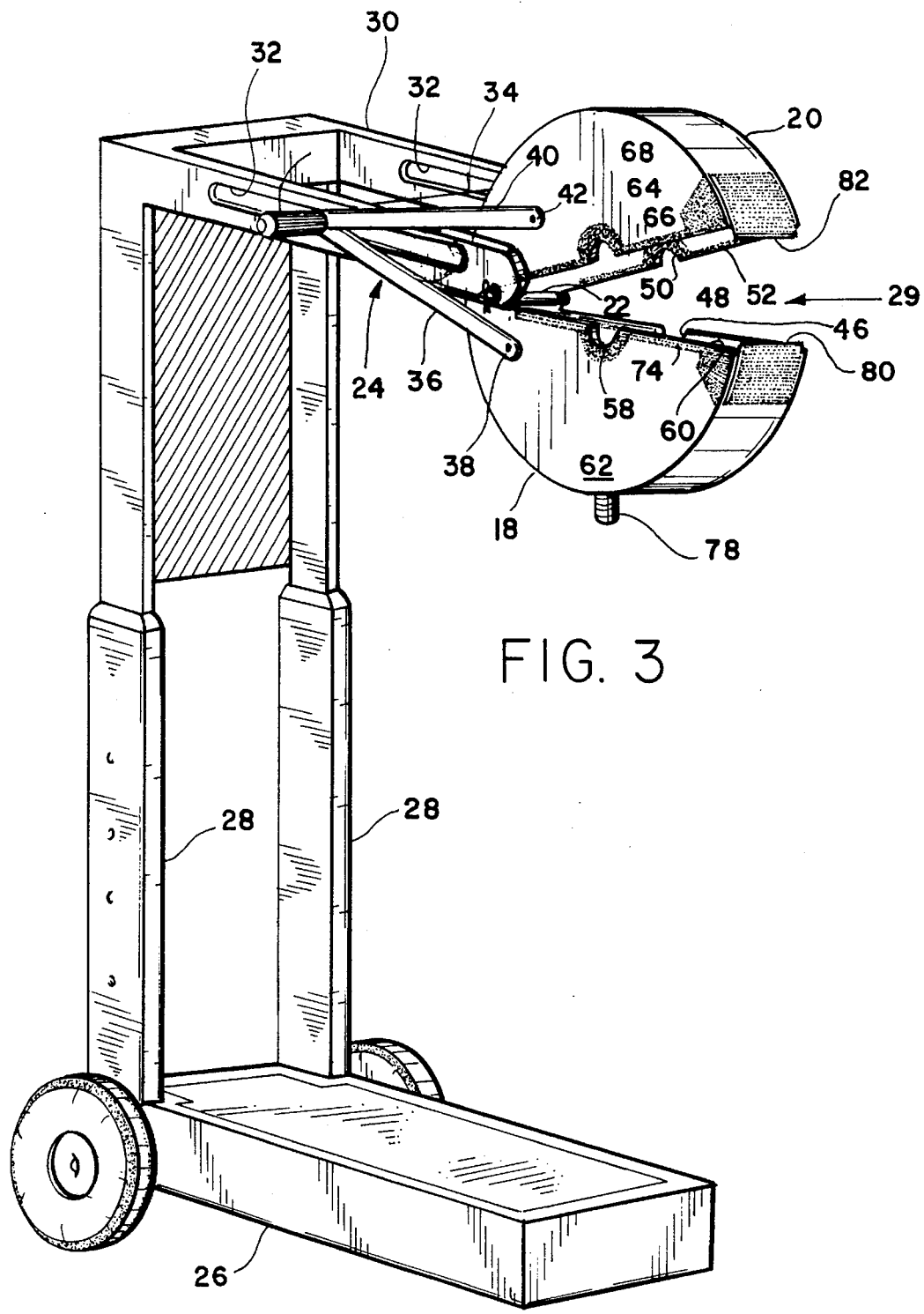
FIG. 3 is a top side perspective view of the invention with the housings closed and partial perspective of the brake resurfacing lathe expansible bellows, the housings shown receiving the brake disc resurfacing lathe expansible bellows.

Referring to FIGS. 2 and 3, the invention includes two semicylindrically-shaped housings 18 and 20. The housings 18 and 20 are pivotally mounted to each other by a pin 22.

The invention includes articulation means 24 for rotating the housings 18 and 20 closed and forming a chamber 29 having a central axis. The chamber 29 is dimensioned and configured to receive a brake disc (not shown). The articulation means 24 includes a base 26. Two expansible vertical support members 28 extend from the base 26. A horizontal arm 30 extends from each vertical support member 28. Each horizontal arm 30 has a horizontal slot 32 therethrough. A pin 34 is dimensioned and configured to be slidingly received in each slot 32. A set of control arms 36 are pivotally connected to the pin 34 and a pin 38. A set of control arms 40 are pivotally connected to the pin 34 and a pin 42. As shown in FIG. 2, translating the pin 34 to the left rotates and opens the housings 18 and 20. Translating the pin 34 to the right rotates and closes the housings 18 and 20.

The pin 34 may be connected to a handle 44. The handle 44 provides means for a user to drive the pin 34 within the slot 32. Other means (not shown) for translating the pin 34 may be selected from, but is not limited to the group including: worm drive gears, spring and latch means, piston and cylinder servo means, rack and pinion means, stepper motor means, electro-magnetic means and the like.

The housing 18 has a first notch 46 disposed in the straight edge 48 of a first vertical face 49. The housing 20 has a second notch 50 disposed in the straight edge 52 of a second vertical face 56. When the housings 18 and 20 are closed, the notches 46 and 50 define a first throughbore 54 through the vertical face defined by the vertical faces 49 and 56 of housing 18 and 20, respectively. The first throughbore 54 sealingly receives the expansible bellows 16 of a drum/disc lathe 12.

Referring also to FIG. 1, the housing 18 has a third notch 58 disposed in the straight edge 60 of a third vertical face 62. The housing 20 has a fourth notch 64 disposed in the straight edge 66 of a fourth vertical face 68. When the housings 18 and 20 are closed, the notches 58 and 64 define a second throughbore 70 in a second vertical face 72. The second throughbore 70 receives the mounting shaft 14 of the lathe 12.

Referring to FIGS. 2 and 3, the housings 18 and 20 each include peripheral, annular seals 74 and 76, respectively. The seal 74 is received in notches 46 and 58. The seal 76 is received in notches 50 and 64. Leftward pressure exerted against pin 34 increases pressure between seals 74 and 76, enhancing sealing between the housings 18 and 20, the bellows 16 and mounting shaft 14.

During brake disc resurfacing, the bellows 16 translates relative to the throughbore 54 when the lathe is resurfacing a brake drum. Additional sealing (not shown) may supplement seals 74 and 76 local to throughbore 54. The additional sealing may include flaps (not shown) biased against the bellows 16. As the bellows 16 translates, the flaps (not shown) apply constant pressure thereagainst and restrict escape of dust.

Each housing 18 and 20 includes lip seals 80 and 82, respectively. During brake disc resurfacing, a cutting tool (not shown) penetrates the lip seals 80 and 82 and contacts the brake disc (not shown). The lip seals 80 and 82 are biased against the cutting tool (not shown) with sufficient force to maintain a continuous seal around the cutting tool. The lip seals 80 and 82 discourage brake dust from entering the local atmosphere.

The housing 18 also includes a vacuum fitting 78 for introducing a vacuum into the chamber 29. Dust dislodged from the brake disc (not shown) is withdrawn from the chamber 29 through the vacuum fitting 78.

2. Brake Dust Removal Apparatus Method of Use

The invention provides for a method of using the above apparatus. The method includes mounting a vehicle brake disc (not shown) on a brake disc/drum resurfacing lathe mounting shaft 14 by known means.

The method includes locating the housings 18 and 20 proximate to a brake disc (not shown). Once located, the method includes exerting force against pin 34 and closing the housings 18 and 20 and forming a chamber 29 enclosing the brake disc (not shown).

Once the brake disc (not shown) is enchambered, the method provides for voiding the chamber 29 of brake dust during resurfacing of the brake disc (not shown).

Finally, the present method provides for opening the housings 18 and 20 and releasing the brake disc (not shown).

The present invention is not intended to be limited to the sole embodiment described above, but to encompass any and all embodiments within the scope of the following claims.

I claim:

1. A dust removal apparatus comprising:

a first housing;

a second housing;

hinge means for pivotally connecting said first housing to said second housing;

said first housing and said second housing rotatable between an open position and a closed position;

said first housing and said second housing, rotated to said closed position, defining a chamber having a central axis, said chamber dimensioned and configured to receive a brake disc;

removal means for removing dust from said chamber; and articulation means including:
- at least one horizontal arm having a slot;
- hinge means for pivotally connecting said horizontal arm to said first and second housings;
- a pin disposed in said slot;
- at least one first control arm rotatably connected to said pin;
- hinge means for pivotally connecting said first control arm to said first housing;
- at least one second control arm rotatably connected to said pin; and
- hinge means for pivotally connecting said second control arm to said second housing;

whereby, translation of said pin in said slot induces said first control arm to rotate said first housing relative to said horizontal arm, and said second control arm to rotate said second housing in an opposite direction relative to said horizontal arm.

2. An apparatus as recited in claim 1, wherein said first housing and said second housing are each semicylindrically-shaped.

3. An apparatus as recited in claim 1, said removal means including vacuum means for voiding said chamber.

4. An apparatus as recited in claim 3, said first housing including an aperture for receiving said vacuum means.

5. An apparatus as recited in claim 1, further including sealing means interposed between said first housing and said second housing.

6. An apparatus as recited in claim 1, further including driving means for translating said pin.

7. A dust removal apparatus comprising:

a first housing;

a second housing;

hinge means for pivotally connecting said first housing to said second housing;

said first housing and said second housing rotatable between an open position and a closed position;

said first housing and said second housing, rotated to said closed position, defining a chamber having a central axis, said chamber dimensioned and configured to receive a brake disc;

said first housing including a first lip seal, said second housing including a second lip seal, said first and second lip seals being biased toward each other, said first and second lip seals sealingly receiving a cutting tool introduced into said chamber therebetween; and removal means for removing dust from said chamber.

8. A dust removal apparatus comprising:

a first semicylindrically-shaped housing;

a second semicylindrically-shaped housing;

hinge means for pivotally connecting said first housing to said second housing;

said first housing and said second housing rotatable between an open position and a closed position;

said first housing and said second housing, rotated to said closed position, defining a chamber having a central axis, said chamber dimensioned and configured to receive a brake disc;

said first housing having a first straight edge and a second straight edge, said second housing having a third straight edge and a fourth straight edge;

said first straight edge mating with said third straight edge and said second straight edge mating with said fourth straight edge when said first housing and said second housing are rotated to said closed position;

a first notch and a second notch disposed in said first straight edge and said second straight edge, respectively;

a third notch and a fourth notch disposed in said third straight edge and said fourth straight edge, respectively;

said first notch and said third notch defining a first throughbore through said chamber when said first housing and said second housing are rotated to said closed position, said second notch and said fourth notch defining a second throughbore through said chamber when said first housing and said second housing are rotated to said closed position; and removal means for removing dust from said chamber.

\* \* \* \* \*